No. 794,528. PATENTED JULY 11, 1905.
J. W. MEIXELL.
WHEEL.
APPLICATION FILED JAN. 9, 1905.
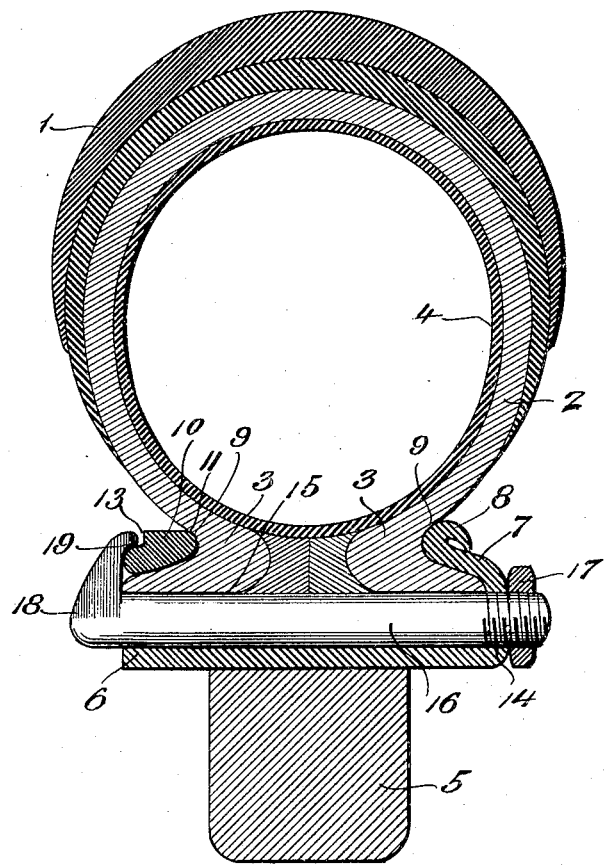
Witnesses:
C. F. Duvall
T. S. Beall
Inventor:
John W. Meixell,
by W. S. Duvall
Attorney No. 794,528. Patented July 11, 1905.

UNITED STATES PATENT OFFICE.

JOHN W. MEIXELL, OF LEWISBURG, PENNSYLVANIA.

WHEEL.

SPECIFICATION forming part of Letters Patent No. 794,528, dated July 11, 1905.

Application filed January 9, 1905. Serial No. 240,247.

*To all whom it may concern:*

Be it known that I, JOHN W. MEIXELL, a citizen of the United States, residing at Lewisburg, in the county of Union and State of Pennsylvania, have invented a Wheel, of which the following is a specification.

This invention relates to improvements in wheels, especially those employed in connection with the well-known "clencher," or the mechanically-fastened detachable style of pneumatic tires used in automobile construction.

The principal objects of my invention are to produce such wheels with a rim and a convenient construction of fastening means, the latter combining with the former to engage and effectually retain therebetween the conventional form of tire, to construct the said rim and fastening means so as to obviate all stretching of the tire when removing or applying the same, and to enable the tire to be removed and replaced without the necessity of removing bolts and nuts or the use of any special tools.

Other objects and advantages of the invention will hereinafter appear and the novel features thereof will be particularly pointed out in the claims.

Referring to the drawing, which is a transverse sectional view through the rim of a wheel embodying my invention, a tire being shown in position thereon, 1 designates a pneumatic tire of conventional shape and construction and of the style known as "clencher" or detachable, mechanically fastened. This tire, as is usual, comprises the outer casing 2, formed of fabric and rubber, and has its inner edges outwardly flared to form the opposite bases 3 and the inner tube 4. Of course the construction of the tire may be varied at will, the only essential being that there must be present flaring bases, which constitute the flanges by which the base of the casing is held upon the rim. The felly 5 of the rim is provided with a somewhat wider flat metallic rim 6, one edge of which is left perfectly plain and the other side or edge of which is bent upward and inward to form an inclined retaining-flange 7, the extremity of which may be turned or rolled upon itself to form a bead 8.

The shape and disposition of the flange 7 and bead 8 are such as to enable the former to conform to the flange 3 of the outer casing and the said bead to fit within the groove 9, resulting from the formation of the flange 3.

10 designates a retaining or locking ring, the inner edge of which is preferably rounded and somewhat reduced, as at 11, to take into and fit the groove 9 at the opposite side of the outer casing at which the bead 8 is located. The under side of this ring is inclined to fit or conform to the upper side of the flange. The opposite or outer edge of the ring 10 is preferably formed with an angular groove or shoulder 13, extending annularly around the ring.

At suitable intervals the flange 7 is provided with transverse bolt-holes 14, and coincident therewith the base and flanges of the outer casing is likewise formed with transverse bolt-holes 15. Through these coinciding bolt-holes 14 and 15 retaining or fastening bolts 16 are passed, said bolts each having an outer threaded end, provided with a nut 17 and at its inner end formed with a flange-like head 18. The head 18 extends to one side only of the bolt and at an angle thereto, and at its extremity upon its inner side is formed with a locking-ring engaging finger or shoulder 19, disposed transverse the head and inwardly toward the shank, and so located that when the bolt is turned so that its head 18 is radial with relation to the wheel the finger or shoulder is in position when the nut is tightened on the bolt to engage the shoulder 13 of said locking-ring. It will be observed that by forming the head at one side of the bolt only the remainder of the bolt is left cylindrical, the function and object of which will hereinafter appear.

In placing the tire upon the wheel after said tire has been mounted in position with its outer flange 3 snugly under the retaining-flange 7 of the rim the locking-ring 10 is then placed in position in the opposite groove 9. Each bolt 16 is then successively partially rotated until its finger 19 is enabled to engage the annular groove or shoulder 13 of the ring, and its nut then tightened. In this manner the ring is gradually caused to securely clamp the tire against the stationary flange at the opposite side of the wheel. When thus clamped, both lateral and longitudinal movement of the tire will be impossible, the ring and flange holding the tire against movement laterally and the bolts preventing all tendency to creep. The operation of removing the tire from the wheel is equally simple. To accomplish this, it is simply necessary to loosen the nuts of the bolts sufficiently to enable the bolts to be moved longitudinally to disengage the fingers from the locking-ring and subsequently to reverse the position of the bolts, and hence the bolt-heads, with their locking-fingers. This partial rotation of the bolts brings the heads thereof pointing inwardly, so that only the cylindrical portions of the bolts are toward the tire. The locking-ring is then removed and the tire itself slipped laterally from the rim.

It will be observed that a simple wrench is all the tool necessary, no special tools whatever being required. Also it will be observed that in removing a tire the bolts and their nuts remain in position upon the rim, which not only greatly facilitates the operation by lessening the labor usually involved, but obviates possible loss of these parts and also the stripping and crossing of the threads of the bolts.

Having described my invention, what I claim is—

1. The combination, of a tire of the class described, provided at opposite sides of its base with oppositely-flared portions and at intervals provided with transverse bolt-holes, and a wheel having a rim approximating the width of the tire and supporting the same and having one edge bent to form a flange conforming to the shape of the base of the tire and provided at intervals with bolt-holes coincident with those of the tire, a locking-ring arranged upon the opposite flared portion of the base of the tire and substantially conforming thereto and having its outer side provided with an angular shoulder or groove, bolts located in the bolt-holes of such tire and rim and terminating at one end in a right-angularly-disposed head provided with an engaging finger for taking over the shoulder of the locking-ring, and nuts for the opposite ends of the bolts.

2. The combination, of a tire of the class described, having its base provided at intervals with transverse bolt-holes, a wheel having a rim terminating at one edge in a flange engaging the tire-base and provided with bolt-holes agreeing with those in the tire, a locking-ring arranged on the opposite base of the tire, and bolts passing through the holes of the flange and tire-base and terminating in heads removably engaging the locking-ring, and fastening devices for the opposite ends of the bolts.

3. The combination, of a tire of the class described, having its base flared in opposite directions and provided with bolt-holes, a wheel having a flat rim terminating at one side in a flange engaging the base and provided with holes coincident with those of the tire-base, a ring fitting the opposite flange of the tire, bolts passed through the holes of the flange and tire-base and terminating in heads for engaging the ring, and nuts for the bolts.

4. The combination of a tire of the class described, a wheel, a rim for supporting the tire, said rim terminating at one edge in a flange fitting the base of the tire, a locking-ring removably fitting the opposite base of the tire, and bolts for temporarily engaging the locking-ring, said bolts passing through the rim and tire, and provided at one side only of their cylindrical shanks with angularly-disposed ring-engaging heads, whereby, when the bolts are partially rotated or reversed from their locking positions the cylindrical portions thereof are outward.

5. The combination of a tire of the class described, a wheel comprising a rim for supporting the tire, the latter having at one side an integral flange fitting the base of the tire, a locking-ring removably mounted upon the opposite side of the tire-base and out of contact with the rim, and means for engaging in a removable manner the locking-ring and laterally drawing the same toward the said flange of the rim.

6. The combination of a tire of the class described, a wheel having a rim, an abutment at one side of the rim and engaging the tire-base, a ring at the opposite side of the tire-base and serving to retain the same, and bolts carried by the wheel and provided at one side of their axial center with angularly-disposed heads terminating in inwardly-disposed ring-engaging fingers.

7. The combination of a tire of the class described, a wheel having a rim, an abutment at one side of the rim and engaging one side of the tire-base, a ring mounted removably upon the opposite side of the tire-base and provided along its outer side with an annular shoulder or groove, and bolts carried by the wheel and terminating at one end in angularly-disposed heads having inwardly-disposed fingers engaging the said groove of the ring and at their opposite ends provided with nuts.

In testimony whereof I have signed my name to this specification in the presence of two subscribing witnesses.

JOHN W. MEIXELL.

Witnesses:
PHILIP B. LINN,
WM. R. FOLLMER.